US011808229B2

(12) United States Patent
Andou et al.

(10) Patent No.: US 11,808,229 B2
(45) Date of Patent: Nov. 7, 2023

(54) REIGNITION PROCESSING DEVICE, REIGNITION METHOD, AND PROGRAM FOR GAS ENGINE

(71) Applicant: MITSUBISHI HEAVY INDUSTRIES ENGINE & TURBOCHARGER, LTD., Sagamihara (JP)

(72) Inventors: Junnosuke Andou, Tokyo (JP); Masato Mitsuhashi, Tokyo (JP); Hiroaki Tsubokawa, Sagamihara (JP); Takahiro Koakutsu, Sagamihara (JP)

(73) Assignee: MITSUBISHI HEAVY INDUSTRIES ENGINE & TURBOCHARER, LTD., Kanagawa (JP)

(*) Notice: Subject to any disclaimer, the term of this patent is extended or adjusted under 35 U.S.C. 154(b) by 0 days.

(21) Appl. No.: 17/771,931

(22) PCT Filed: Oct. 28, 2020

(86) PCT No.: PCT/JP2020/040529
§ 371 (c)(1),
(2) Date: Apr. 26, 2022

(87) PCT Pub. No.: WO2021/090749
PCT Pub. Date: May 14, 2021

(65) Prior Publication Data
US 2022/0372928 A1  Nov. 24, 2022

(30) Foreign Application Priority Data

Nov. 5, 2019  (JP) ................................. 2019-201065

(51) Int. Cl.
*F02D 41/00* (2006.01)
*F02D 41/22* (2006.01)
(Continued)

(52) U.S. Cl.
CPC .......... *F02D 41/22* (2013.01); *F02D 35/023* (2013.01); *F02D 41/0027* (2013.01);
(Continued)

(58) Field of Classification Search
CPC .. F02D 41/22; F02D 41/0027; F02D 41/1498; F02D 41/0087; F02D 41/04;
(Continued)

(56) References Cited

U.S. PATENT DOCUMENTS 5,038,744 A * 8/1991 Martin ..................... F02P 15/10
                                                     123/625
5,460,129 A * 10/1995 Miller ........................ F01L 9/10
                                                    123/90.15
(Continued)

FOREIGN PATENT DOCUMENTS

JP    2008-208804 A    9/2008
JP    4823103 B2       11/2011
(Continued)

OTHER PUBLICATIONS

International Preliminary Report on Patentability and Written Opinion of the international Searching Authority for international Application No. POT/JP2020/040529, dated May 19, 2022 with English translation.
(Continued)

*Primary Examiner* — Phutthiwat Wongwian
*Assistant Examiner* — Sherman D Manley
(74) *Attorney, Agent, or Firm* — BIRCH, STEWART, KOLASCH & BIRCH, LLP

(57) ABSTRACT

A reignition processing device for a gas engine for executing a reignition process of a cylinder during operation of a gas engine having multiple cylinders is provided with: an execution permission unit configured to, when at least one of the cylinders misfires, perform permission determination
(Continued)

whether to execute the reignition process of the misfiring cylinder, on the basis of a damage diagnosis result based on an in-cylinder pressure of the misfiring cylinder, presence or absence of abnormality in a control device which performs combustion control and combustion diagnosis of the gas engine, an operational history related to the misfiring cylinder, and an operational state of the gas engine; and a reignition execution unit configured to execute the reignition process of the misfiring cylinder that is permitted by the permission determination to execute the reignition process.

12 Claims, 7 Drawing Sheets

(51) Int. Cl.
  *F02D 35/02* (2006.01)
  *F02D 41/14* (2006.01)
  *F02P 5/152* (2006.01)
(52) U.S. Cl.
  CPC ........ *F02D 41/1498* (2013.01); *F02P 5/1522* (2013.01); *F02D 2200/1015* (2013.01)
(58) Field of Classification Search
  CPC ........... F02D 35/023; F02D 2200/1015; F02D 19/024; F02D 19/025; F02D 19/02; F02D 43/00; F02D 37/02; F02D 45/00; F02P 5/1522; Y02T 10/30
  See application file for complete search history.

(56) References Cited

U.S. PATENT DOCUMENTS

| | | | |
|---|---|---|---|
| 6,763,806 B2 * | 7/2004 | Hosoya | F02D 35/023 123/406.27 |
| 2012/0290196 A1 | 11/2012 | Sano et al. | |
| 2015/0000635 A1 | 1/2015 | Nishio et al. | |

FOREIGN PATENT DOCUMENTS

| | | |
|---|---|---|
| JP | 5240370 B2 | 7/2013 |
| JP | 2013-174146 A | 9/2013 |
| JP | 2015-137579 A | 7/2015 |

OTHER PUBLICATIONS

International Search Report for International Application No. PCT/JP2020/040529 dated Dec. 15, 2020.

* cited by examiner

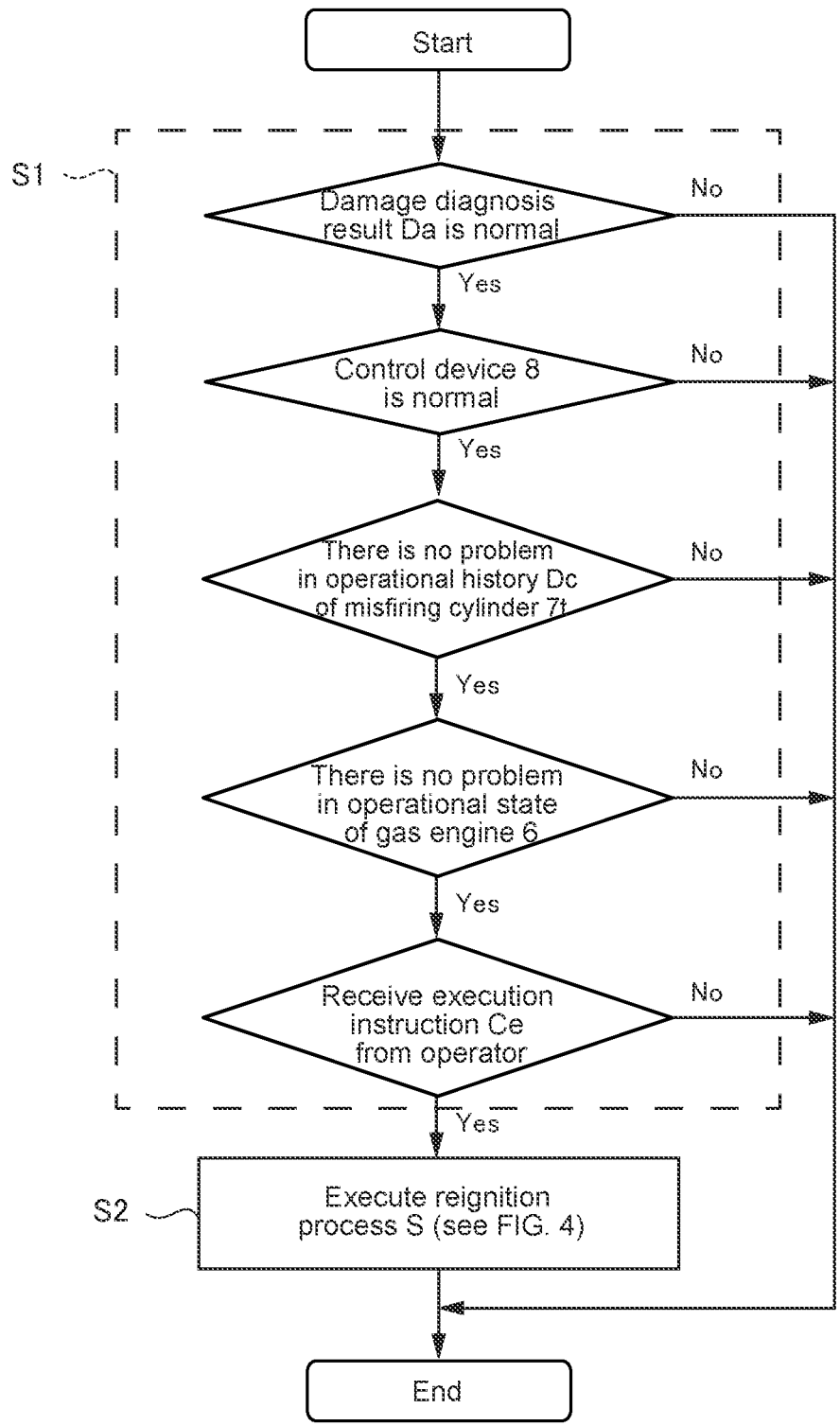

REIGNITION PROCESSING DEVICE, REIGNITION METHOD, AND PROGRAM FOR GAS ENGINE

TECHNICAL FIELD

The present disclosure relates to a gas engine having multiple cylinders, and particularly to a technique for individually reigniting a misfiring cylinder without stopping the gas engine.

BACKGROUND

Generally, a gas engine having multiple cylinders and is used in applications such as power generation. This type of gas engine usually has a precombustion chamber, which is provided with the same number of main chambers (main combustion chambers) as cylinders, each defined by a cylinder head and pistons slidably disposed within the cylinders, and prechambers (precombustion chambers) connected to the main chambers through nozzle holes. Further, a lean air-fuel mixture obtained by premixing fuel gas and air is supplied to the respective main chambers of the cylinders, and the lean air-fuel mixture in each main chamber is ignited and combusted by a combustion flame (torch) generated by an ignition device with the prechamber disposed in the main chamber. The ignition device is known to be classified to a pilot ignition system in which liquid fuel (pilot fuel) is injected into the prechamber to ignite the fuel gas in the prechamber, and a spark ignition system in which the fuel gas in the prechamber is ignited by a spark plug.

Since the gas engine combusts a lean air-fuel mixture as described above, there is a high possibility that a misfire or a combustion failure (abnormal combustion) occurs as compared with a diesel engine or the like. When a misfire occurs in the gas engine, it induces problems such as a decrease in engine output due to insufficient combustion and a failure of moving parts due to an increase in revolution speed fluctuation. However, for example, the gas engine for power generation needs to be continuously operated for power supply, and it is not easy to stop the gas engine even if one or more cylinders misfire. On the other hand, the continuous operation in the misfiring state requires to reduce the engine output in order to suppress the overload of operating cylinders, which indicates that the operation is continued with the risk of demand-over until the gas engine is stopped next time and all cylinders fire again.

In response to such problems, for example, Patent Document 1 discloses a method in which the occurrence of a misfire is detected, and after the detection, reignition is performed in the cylinder that misfires (hereinafter, misfiring cylinder) without stopping the operation of the gas engine. Specifically, when the occurrence of a misfire is detected in a pilot ignition gas engine, after confirming the soundness of the misfiring cylinder, the ignition condition is determined by adjusting the injection amount and injection timing of the pilot fuel into the prechamber. Then, the air excess ratio of the air-fuel mixture in the main chamber is adjusted while changing the setting of the injection amount of the gas fuel, and reignition is performed. It is described that the adjustment of the air excess ratio involves initially setting the injection amount (injection period) of gas fuel to a smaller value than the input amount of gas fuel during normal operation, which is set depending on the speed and load of the gas engine. This makes it possible to set an air excess ratio at which combustion can be confirmed. Further, Patent Document 2 discloses that the occurrence of a misfire is determined for each cylinder, the supply of fuel gas to the misfiring cylinder is stopped, and the gas engine is stopped if multiple cylinders misfire at the same time.

CITATION LIST

Patent Literature

Patent Document 1: JP4823103B
Patent Document 2: JP2013-174146A

SUMMARY

Problems to be Solved

However, if the misfire is not transient and is caused by some abnormality (failure) that constantly occurs in the gas engine, repeated reignition may lead to engine damage. Further, in such a case, the execution of the reignition process of the misfiring cylinder may induce a misfire or abnormal combustion of other cylinders, which may open the possibility of deteriorating the operating state of the gas engine, such as a further decrease in engine output or a situation requiring an emergency shutdown.

In view of the above, an object of at least one embodiment of the present invention is to provide a reignition processing device for a gas engine which executes reignition when the cause of a misfire is determined to be transient.

Solution to the Problems

A reignition processing device for a gas engine according to at least one embodiment of the present invention is a device for executing a reignition process of a cylinder during operation of a gas engine having multiple cylinders, comprising: an execution permission unit configured to, when at least one of the cylinders misfires, perform permission determination whether to execute the reignition process of the misfiring cylinder, on the basis of a damage diagnosis result based on an in-cylinder pressure of the misfiring cylinder, the presence or absence of abnormality in a control device which performs combustion control and combustion diagnosis of the gas engine, an operational history related to the misfiring cylinder, and an operational state of the gas engine; and a reignition execution unit configured to execute the reignition process of the misfiring cylinder that is permitted by the permission determination to execute the reignition process.

A reignition method for a gas engine according to at least one embodiment of the present invention is a method for executing a reignition process of a cylinder during operation of a gas engine having multiple cylinders, comprising: a step of, when at least one of the cylinders misfires, performing permission determination whether to execute the reignition process of the misfiring cylinder, on the basis of a damage diagnosis result based on an in-cylinder pressure of the misfiring cylinder, the presence or absence of abnormality in a control device which performs combustion control and combustion diagnosis of the gas engine, an operational history related to the misfiring cylinder, and an operational state of the gas engine; and a step of executing the reignition process of the misfiring cylinder if execution of the reignition process is permitted by the permission determination.

A reignition program for a gas engine according to at least one embodiment of the present invention is a program for executing a reignition process of a cylinder during operation of a gas engine having multiple cylinders, being configured to cause a computer to implement: an execution permission unit configured to, when at least one of the cylinders misfires, perform permission determination whether to execute the reignition process of the misfiring cylinder, on the basis of a damage diagnosis result based on an in-cylinder pressure of the misfiring cylinder, the presence or absence of abnormality in a control device which performs combustion control and combustion diagnosis of the gas engine, an operational history related to the misfiring cylinder, and an operational state of the gas engine; and a reignition execution unit configured to execute the reignition process of the misfiring cylinder if execution of the reignition process is permitted by the permission determination.

Advantageous Effects

At least one embodiment of the present invention provides a reignition processing device for a gas engine which executes reignition when the cause of a misfire is determined to be transient.

BRIEF DESCRIPTION OF DRAWINGS

FIG. 7 is a diagram showing a reignition method for a gas engine according to an embodiment of the present invention.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
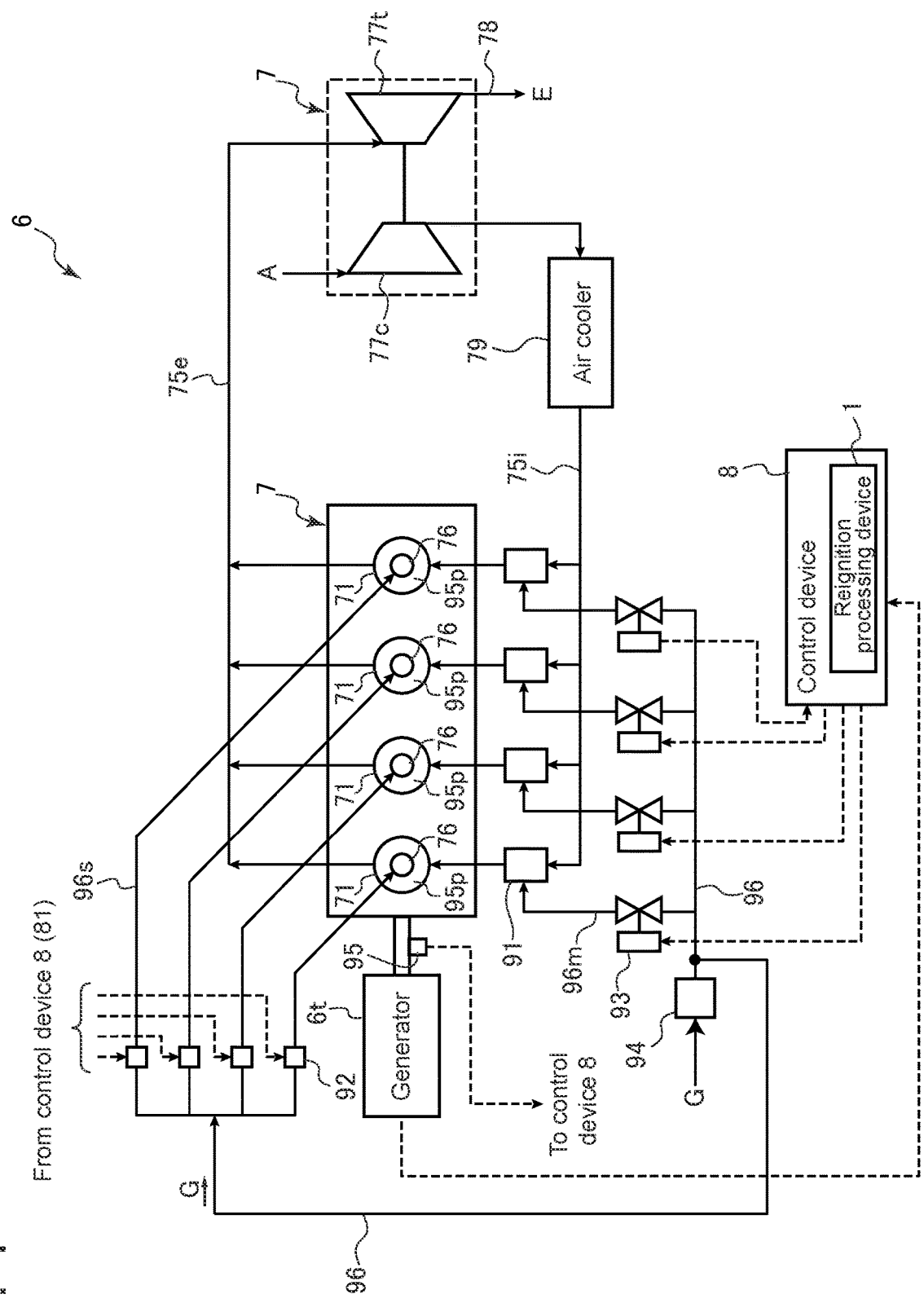
FIG. 1 is a schematic configuration diagram of a gas engine according to an embodiment of the present invention.
Figure 2:
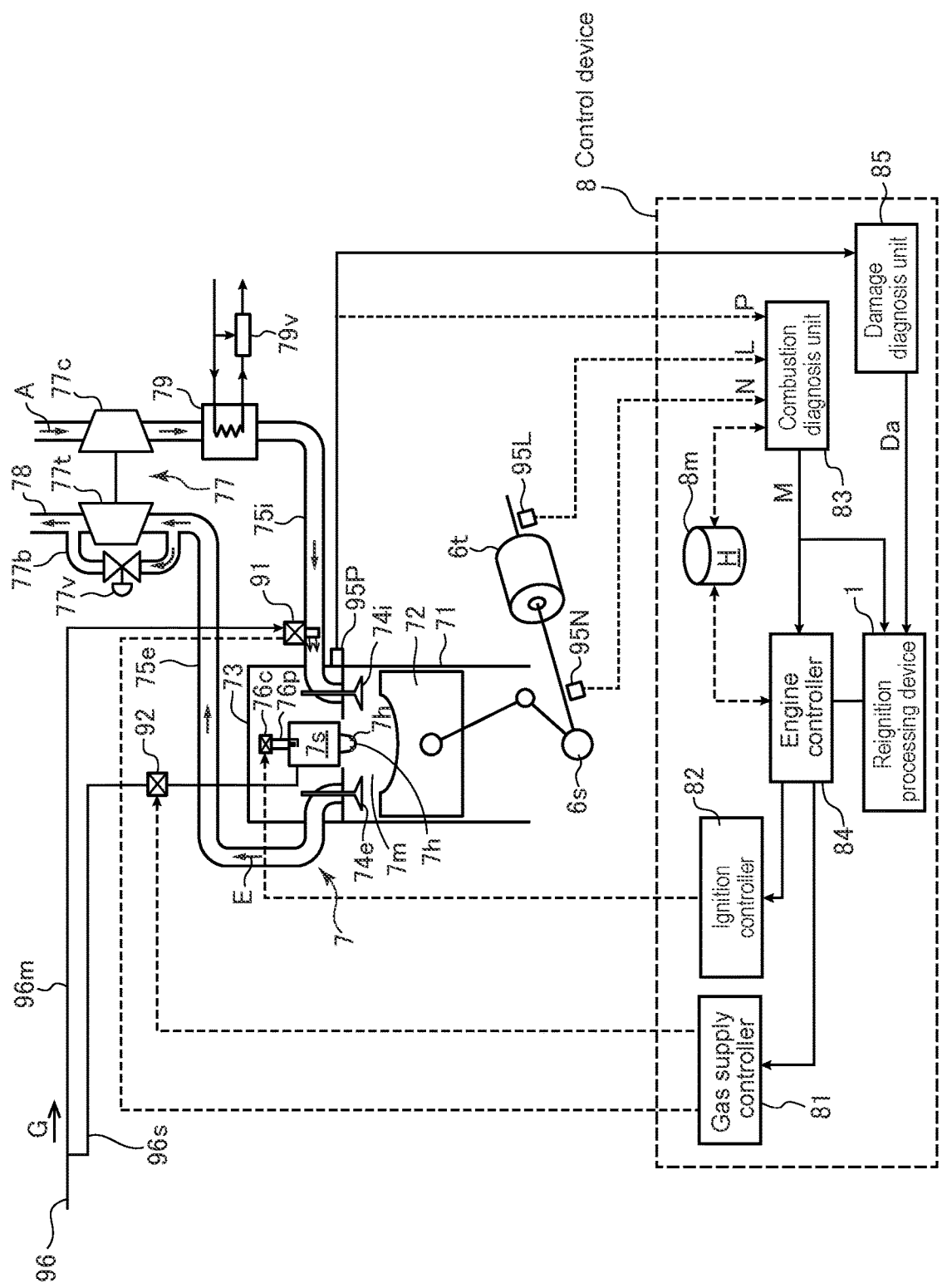
FIG. 2 is a schematic diagram of a control device of a gas engine according to an embodiment of the present invention.

FIG. 1 is a schematic configuration diagram of a gas engine 6 according to an embodiment of the present invention. FIG. 2 is a schematic diagram of a control device 8 of the gas engine 6 according to an embodiment of the present invention.

As shown in FIGS. 1 and 2, the gas engine 6 includes an engine 7 which is a four-cycle reciprocating engine in which fuel gas G is used as fuel, and a control device 8 for performing combustion control in each cylinder 71.

The engine 7 has multiple cylinders 71 formed therein. Further, as shown in FIG. 2, the engine 7 has multiple main chambers 7m (main combustion chambers) defined by an upper surface of a piston 72 slidably disposed within each cylinder 71 and a lower surface of a cylinder head 73, and an ignition device 76 disposed for each main chamber 7m (cylinder 71). Each main chamber 7m is supplied with a mixture (lean air-fuel mixture) of fuel gas G and intake air (air A) through an intake passage formed in an intake pipe 75i connected to the engine 7 to ignite and combust the mixture by the ignition device 76.

More specifically, as shown in FIG. 1, the intake pipe 75i (intake passage) splits in the middle (downstream of an air cooler 79 in FIG. 1) into the same number of branches as the cylinders 71 so as to be individually connected to the respective main chambers 7m of the cylinders 71. To each branch split from the intake pipe 75i, a main chamber gas supply pipe 96m branched from a fuel supply main pipe 96 is connected for introducing the fuel gas G from the supply source (not shown) of the fuel gas G via a main chamber gas supply electromagnetic valve 91 (regulating valve). By controlling the valve opening degree of the main chamber gas supply electromagnetic valve 91 by the control device 8, the flow rate of the fuel gas G supplied to each main chamber 7m is regulated. Further, the fuel gas G supplied from the main chamber gas supply electromagnetic valve 91 to the intake passage and the air A flowing in the intake passage from the upstream side of the main chamber gas supply pipe 96m to the main chamber 7m are mixed and supplied to the main chamber 7m. The provision of the main chamber gas supply electromagnetic valve 91 for each cylinder 71 enables independent and individual adjustment of the flow rate of the fuel gas G supplied to each main chamber 7m included in the engine 7.

On the other hand, a prechamber 7s is formed in each ignition device 76. Each ignition device 76 is disposed in the cylinder head 73 so that the nozzle hole 7h that connects the inside and the outside (the inside of the main chamber 7m) of the prechamber 7s is located in the central portion of the main chamber 7m. When the fuel gas G supplied into the prechamber 7s is ignited by control of the control device 8, a combustion flame generated in the prechamber 7s is injected into the main chamber 7m through the nozzle hole 7h and combusts the air-fuel mixture in the main chamber 7m. As a result, even a lean air-fuel mixture (mixed gas) can be reliably ignited and combusted.

In the embodiment shown in FIGS. 1 and 2, the ignition device 76 is a spark ignition system, which has a spark plug 76p equipped with an ignition coil 76c in order to ignite the fuel gas G supplied into the prechamber 7s (see FIG. 2). The spark plug 76p emits a spark in response to an ignition signal from the control device 8. Further, each prechamber 7s is connected to a prechamber gas supply pipe 96s branched from the fuel supply main pipe 96, and the fuel gas G is supplied to the prechamber 7s at a flow rate individually regulated by a prechamber gas supply electromagnetic valve 92 disposed in each prechamber gas supply pipe 96s. The valve opening degree of the prechamber gas supply electromagnetic valve 92 is controlled by the control device 8.

As shown in FIG. 2, the cylinder head 73 is provided with an intake valve 74i for controlling the connection state between the main chamber 7m and the intake passage, and an exhaust valve 74e for controlling the connection state between the main chamber 7m and an exhaust passage formed in, for example, an exhaust pipe 75e connected to the cylinder head 73. Further, a regulator (not shown) for regulating the pressure of the fuel gas G supplied to the cylinder 71 to a predetermined pressure is arranged on the fuel supply main pipe 96. Additionally, the fuel supply main pipe 96 is provided with a shutoff valve 94 capable of stopping the supply of the fuel gas G to the engine 7.

Further, as shown in FIGS. 1 and 2, the gas engine 6 may include a supercharger 77 (exhaust turbocharger). In the embodiment shown in FIGS. 1 and 2, the supercharger 77 is composed of a turbine 77t driven by exhaust gas E introduced through the exhaust passage and a compressor 77c for air coaxial with the turbine 77t. An exhaust gas outlet pipe 78 is connected to the exhaust gas outlet of the turbine 77t, and a bypass pipe 77b branched from the exhaust pipe 75e at the exhaust gas inlet side of the turbine 77t is connected to the exhaust gas outlet pipe 78 so as to bypass the turbine 77t. The bypass pipe 77b is provided with an exhaust gas bypass valve 77v for regulating the flow rate of the exhaust gas E flowing to the turbine 77t. Further, an air cooler 79 for cooling the compressed air discharged from the compressor 77c is disposed on the downstream side of the supercharger 77 (compressor 77c) in the intake pipe 75i. The air cooler 79 has an intake air temperature regulating valve 79v for regulating the flow rate of cooling water that bypasses the air cooler 79. The cooling capacity of the air cooler 79 is adjusted by the opening degree of this valve.

However, the present invention is not limited to this embodiment. In the present embodiment, the engine 7 has four cylinders 71, but the number of cylinders 71 may be any number more than one, for example, 10 or more. Further, the ignition device 76 may be a pilot ignition system provided with a fuel injection valve in the prechamber 7s, where liquid fuel such as diesel fuel is injected through the fuel injection valve into the air flow formed in the prechamber 7s, and the liquid fuel is ignited and combusted to jet a combustion flame through the nozzle hole 7h. Further, in the present embodiment, the drive target of the gas engine 6 is a generator 6t interlocked with a crank shaft 6s which converts the reciprocating motion of the pistons 72 into rotation, but in some embodiments, the drive target may be any other than the generator 6t.

On the other hand, as shown in FIG. 2, the control device 8 includes a gas supply controller 81 for controlling the supply and cutoff of the fuel gas G to each main chamber 7m and each prechamber 7s and further controlling the supply amount of the fuel gas G, an ignition controller 82 for controlling the ignition in the prechamber 7s by controlling the ignition device 76, a combustion diagnosis unit 83 for diagnosing the combustion state in the main chamber 7m on the basis of detected values of various sensors installed in the gas engine 6, and an engine controller 84 for outputting an operation command for each cylinder 71 to the gas supply controller 81 and the ignition controller 82 while referring to the combustion diagnosis result of each cylinder 71 obtained by the combustion diagnosis unit 83. All of these components may be implemented by the same device, or at least a part of them may be implemented by another device.

More specifically, the combustion diagnosis unit 83 diagnoses the combustion state by detecting the presence or absence of a misfire in each cylinder 71 or the presence or absence of abnormal combustion such as knocking. This diagnosis may be made by a well-known method. It is known that abnormal combustion can be detected based on the in-cylinder pressure P, for example. Further, for example, the occurrence of a misfire in each cylinder 71 may be detected based on the fluctuation value of the load value L detected by a load detector 95L for detecting the load of the generator 6t, the fluctuation value of the rotation speed N detected by a rotation speed detector 95N capable of detecting the rotation speed of the gas engine 6, or the rate of increase or the fluctuation value of the in-cylinder pressure P detected by an in-cylinder pressure detector 95P disposed in each cylinder 71 (see FIG. 1) and capable of detecting the set in-cylinder pressure P of the cylinder 71. Alternatively, the occurrence of a misfire in each cylinder 71 may be detected based on the detected value of the in-cylinder pressure P input from the in-cylinder pressure detector 95P and the detected value of the crank angle input from a crank angle detector (not shown).

When the combustion diagnosis unit 83 determines that a misfire has occurred, the engine controller 84 instructs the gas supply controller 81 to stop the fuel supply (cylinder cut-off) to the main chamber 7m of the cylinder 71 in which the misfire is detected (hereinafter referred to as misfiring cylinder 71t) and the prechamber 7s in the ignition device 76 corresponding to the main chamber 7m of the misfiring cylinder. Further, the engine controller 84 may instruct the ignition controller 82 to stop the ignition operation (spark generation, pilot fuel injection) of the ignition device 76 for combusting the air-fuel mixture in the main chamber 7m of the misfiring cylinder 71t. In the case of the spark ignition, for example, the ignition operation of the ignition device 76 may be continued.

In the misfiring cylinder 71t, combustion in the main chamber 7m and the prechamber 7s is stopped by stopping the fuel supply, but the crank shaft 6s is rotated as long as the gas engine 6 is continuously operated by the remaining cylinders 71 that have not misfired (during cylinder cut-off operation). Therefore, the piston 72 of the misfiring cylinder 71t is still reciprocated by the crank shaft 6s.

In the embodiment shown in FIGS. 1 to 2, the combustion diagnosis unit 83 inputs the diagnosis result of the presence or absence of misfire and the diagnosis result of abnormal combustion such as knocking other than misfire to the engine controller 84. The engine controller 84 is adapted to perform combustion control based on the result of the combustion diagnosis result M. Further, the combustion diagnosis result M and the control contents performed based on the combustion diagnosis result are stored as history information H in a storage unit 8m of the control device 8 in association with time information. Specifically, when abnormal combustion is detected and the supply of fuel to the cylinder 71 with the detected abnormal combustion is stopped, this control content is stored as the history information H.

Further, the control device 8 is configured to store alarm information on hardware or software abnormalities of the devices (81 to 84, etc.) and abnormalities of various sensors (95P, 95L, 95N, etc.) such as the in-cylinder pressure detector 95P, which can be detected by the control device itself, in the storage unit 8m as the history information H in association with time information. Additionally, the control device 8 is configured to receive information reflecting the operational state Dd of the gas engine 6 including the load value L detected by the load detector 95L and the rotation speed N of the gas engine 6 detected by the rotation speed detector 95N, and store necessary information among them in the storage unit 8m as the history information H in association with time information. This history information H can be referred to from the engine controller 84 or a reignition processing device 1, which will be described later.

The gas engine 6 having the above-described configuration further includes a reignition processing device 1 for reigniting the cylinder 71 that misfires (hereinafter referred to as misfiring cylinder 71t). In the embodiment shown in FIGS. 1 and 2, as shown in FIG. 2, the reignition processing device 1 constitutes a part of the control device 8, and when it is detected on the basis of the diagnosis result of the presence or absence of misfire input from the combustion diagnosis unit 83 that at least one cylinder 71 misfires, after determining whether to execute the reignition process (reignition sequence) for reigniting the misfiring cylinder, executes the reignition process, as described below.

Figure 3:
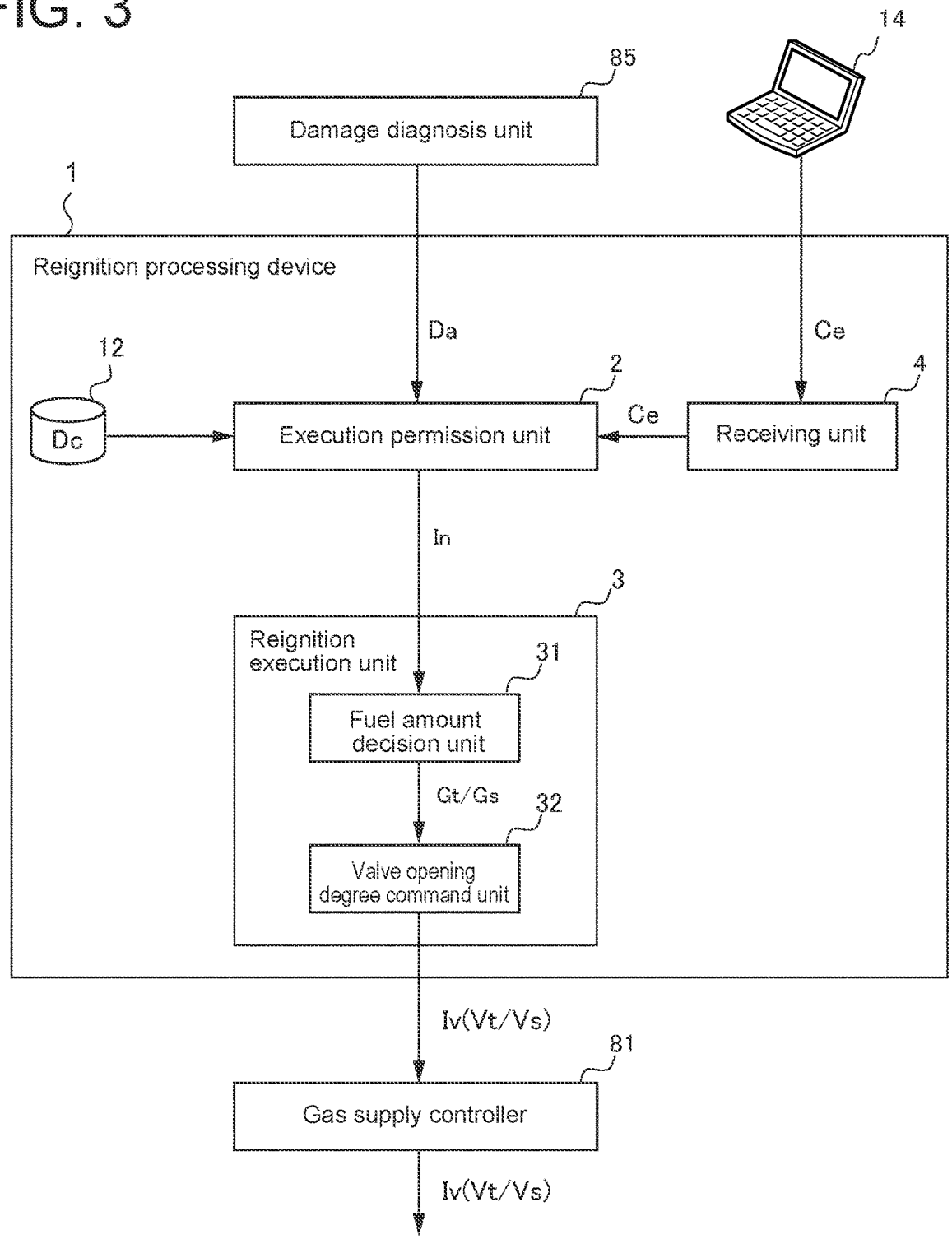
FIG. 3 is a block diagram schematically showing a function of a reignition processing device according to an embodiment of the present invention.
Figure 4:
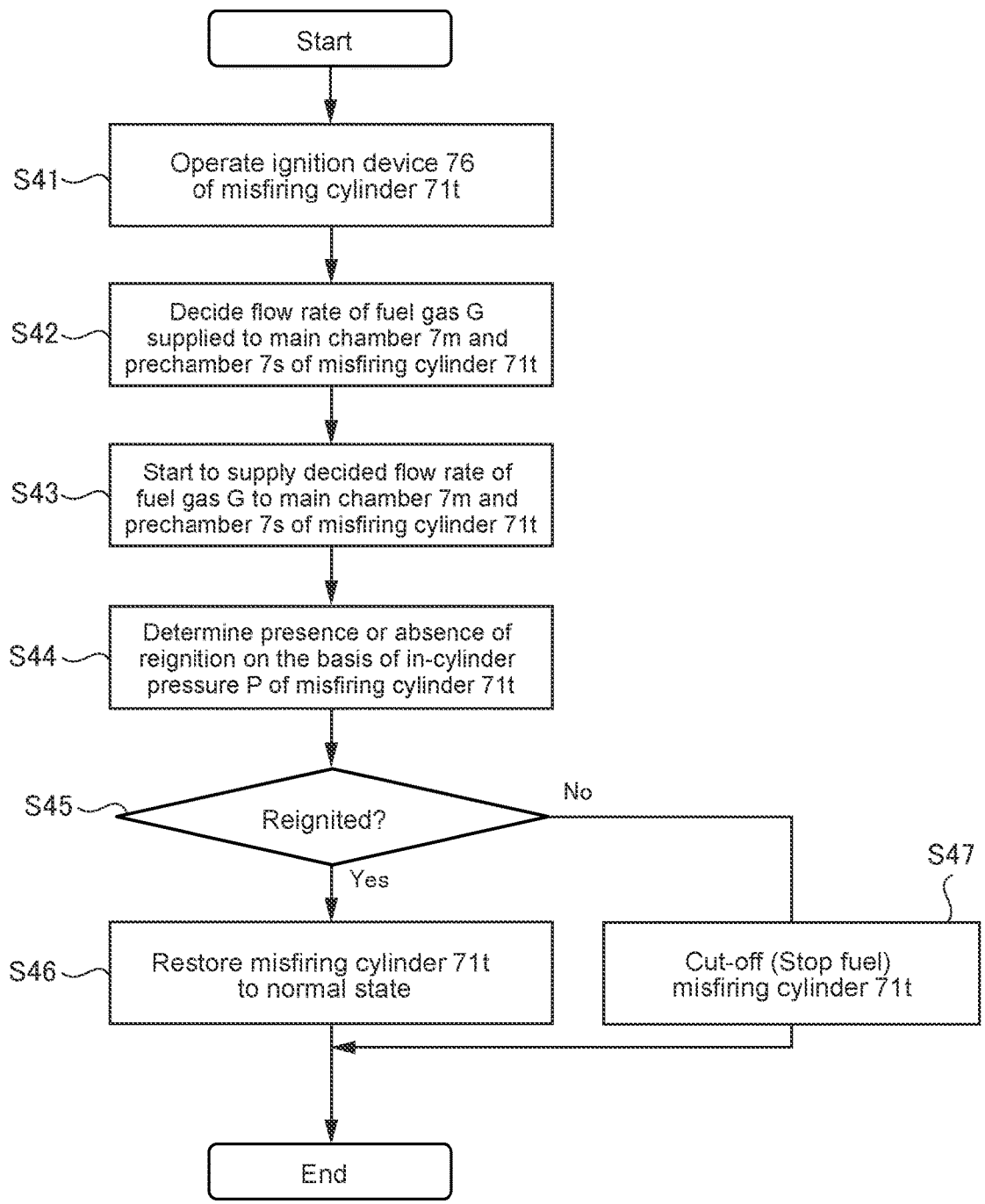
FIG. 4 is a diagram showing an execution sequence of reignition process according to an embodiment of the present invention.

Hereinafter, the reignition processing device 1 of the gas engine 6 will be described with reference to FIGS. 3 to 6. FIG. 3 is a block diagram schematically showing a function of the reignition processing device 1 according to an embodiment of the present invention. FIG. 4 is a diagram showing an execution sequence of the reignition process S according to an embodiment of the present invention.

The reignition processing device 1 of the gas engine 6 (hereinafter, simply reignition processing device 1) is a device for executing the reignition process S of a cylinder (hereinafter, simply reignition process S) for reigniting a misfiring cylinder 71 during the operation of the gas engine 6 having multiple cylinders 71. As shown in FIG. 3 (also see FIG. 6 described later), the reignition processing device 1 includes an execution permission unit 2 and a reignition execution unit 3.

Each functional unit of the reignition processing device 1 will now be described.

The reignition processing device 1 may comprise, for example, a computer including a CPU (processor, not shown) and a storage unit 12 such as ROM and RAM. The CPU operates (e.g. computation of data) in accordance with instructions of program (reignition program) loaded to a memory (main storage device), and thereby the above functional units are implemented. In other words, the above-described program is software for causing the computer to implement the functional units described later, and may be stored in a computer-readable storage medium.

The execution permission unit 2 is a functional unit configured to, when at least one of the cylinders 71 misfires, perform permission determination whether to execute the reignition process S of the misfiring cylinder 71t, on the basis of a damage diagnosis result Da based on the in-cylinder pressure P of the misfiring cylinder 71t, the presence or absence of abnormality in the control device 8 which performs combustion control and combustion diagnosis of the gas engine 6, an operational history Dc related to the misfiring cylinder 71t, and an operational state Dd of the gas engine 6.

Specifically, if the damage diagnosis result Da is normal, the control device 8 has no abnormality, and the operational history Dc and the operational state Dd have no reason to disallow the reignition process S, the execution permission unit 2 permits the execution of the reignition process S assuming that the permission condition is satisfied, and if not, does not permit the execution of the reignition process S. For example, when there are a plurality of misfiring cylinders 71t, permission determination for executing the reignition process S is made for each misfiring cylinder. They may be performed sequentially or in parallel. Then, the reignition process S is executed for the misfiring cylinder 71t that is permitted to execute the reignition process S, and the reignition process S is not executed for the misfiring cylinder 71t that is not permitted to execute the reignition process S.

More specifically, the damage diagnosis based on the in-cylinder pressure P may be performed while the fuel supply to the main chamber 7m and the prechamber 7s of the misfiring cylinder 71t is stopped, and the ignition operation (in FIGS. 1 and 2, the generation of spark) by the ignition device 76 is performed. By monitoring the change in the in-cylinder pressure P in this state, it is possible to detect unintended combustion (explosion) which occurs even when the fuel supply is stopped, and thus it is possible to diagnose the presence or absence of damage to the gas engine 6 such as an abnormality in the fuel supply system. Further, the damage diagnosis may be performed while the fuel supply to the main chamber 7m and the prechamber 7s of the misfiring cylinder 71t is stopped, and the ignition operation by the ignition device 76 is also stopped. By monitoring the change in the in-cylinder pressure P in this state, an abnormality such as a decrease in the compression pressure due to the reciprocating motion of the piston 72 can be detected, and the presence or absence of physical damage to the engine 7 or the ignition device 76 can be diagnosed. Both of these methods may be sequentially performed as the damage diagnosis, or another well-known damage diagnosis method may be applied in place of or in addition to these methods. If the damage diagnosis result Da is not normal, the execution of the reignition process S is not permitted for this reason.

Regarding the presence or absence of abnormality in the control device 8, the permission condition may be that the history information H does not contain predetermined specific alarm information. If the history information H contains the specific alarm information, it is determined that the control device 8 has abnormality, and the execution of the reignition process S is not permitted for this reason.

The permission determination based on the operational history Dc related to the misfiring cylinder 71t may be performed, for example, on the basis of whether the operational history Dc includes a history indicating that the reignition process S has been executed in the past. Specifically, the permission condition based on the operational history Dc in this case may be that the reignition process S has not been executed in the past, or the number of times the reignition process S has been executed is a predetermined number or less. In this case, if the operational history Dc of the misfiring cylinder 71t includes a history of execution of the reignition process S, or if the number of execution times is more than a predetermined number, the execution of the reignition process S is not permitted for this reason. The operational history Dc may be stored in the storage unit 12 included in the reignition processing device 1.

The permission determination based on the operational state Dd of the gas engine 6 may be at least one of that the load of the gas engine 6 at the time of misfire is constant, or the load of the gas engine 6 at the time of execution of the reignition process is constant. If the cylinder 71 misfires when the load is not constant, it is possible that this misfire is caused by a problem due to load fluctuation. Further, if the reignition process S is executed when the load is not constant, it is possible that the reignition process S fails due to load fluctuation. Therefore, this permission condition prevents interference with such a problem due to load fluctuation. In this case, if the load is not changed at the time of misfire of the cylinder 71, or if it is expected that the load fluctuates during the execution of the reignition process S, the execution of the reignition process S is not permitted for this reason. The load value L at the time of misfire may be acquired from the history information H. Further, the load value L at the time of execution of the reignition process may be acquired by prediction based on an operation plan, a past history, or the like.

Further, in the permission determination based on the operational state Dd of the gas engine 6, the permission condition may be that the total number of misfiring cylinders 71t that misfire at the same time is equal to or less than a threshold (for example, 1 or less, or 2 or less). The gas engine 6 needs to be temporarily stopped when a specified number of cylinders 71 misfire at the same time, but the threshold may be set to a value smaller than the specified number at which the gas engine 6 needs to be stopped (restarted). In this case, even if the other cylinders 71 misfire due to the execution of the reignition process S of the misfiring cylinder 71t, it is possible to avoid the situation where the gas engine 6 is stopped.

When the permission determination based on the operational history Dc related to the misfiring cylinder 71t and the permission determination based on the operational state Dd of the gas engine 6 do not satisfy at least one permission condition to be confirmed in the determination, the execution of the reignition process S is not permitted for this reason.

In the embodiments shown in FIGS. 1 to 3, the control device 8 includes a damage diagnosis unit 85 configured to perform damage diagnosis based on the in-cylinder pressure P. The damage diagnosis result Da of the damage diagnosis unit 85 is input to the reignition processing device 1. Further, the permission determination based on each presence or absence of abnormality in the control device 8 and the operational state Dd is made on the basis of the information stored in the storage unit 8m of the control device 8.

The reignition execution unit 3 is a functional unit configured to execute the reignition process S of the misfiring cylinder 71t that is permitted by the permission determination of the execution permission unit 2 to execute the reignition process S. The reignition execution unit 3 may execute the reignition process S by using the function of the engine controller 84 to issue commands to the gas supply controller 81 and the ignition controller 82 according to the execution sequence of the reignition process S. Alternatively, the reignition execution unit 3 may execute the reignition process S by directly issuing the commands to the gas supply controller 81 and the ignition controller 82 without the engine controller 84. If the reignition process S is permitted for a plurality of misfiring cylinders 71t, they may be executed sequentially or in parallel.

The reignition process S may be executed according to the flowchart shown in FIG. 4, for example. In the present embodiment, the fuel supply to the main chamber 7m and the prechamber 7s of the misfiring cylinder 71t is stopped (cylinder cut-off) when a misfire is detected. Further, the ignition by the spark plug 76p is also stopped.

In step S41 of FIG. 4, the ignition device 76 of the misfiring cylinder 71t is operated. In the embodiment shown in FIGS. 1 and 2, the ignition operation by the ignition device 76 takes place by starting the ignition by the spark plug 76p. Even during a misfire, the ignition operation by the ignition device 76 may be continued. In this case, step S41 may be omitted.

In step S42, the reignition execution unit 3 decides the flow rate of the fuel gas G supplied to each main chamber 7m and the prechamber 7s of the misfiring cylinder 71t. Specifically, the flow rate of the fuel gas G supplied to the main chamber 7m may be decided as described later, for example. Further, the flow rate of the fuel gas supplied to the prechamber 7s may be decided according to the operational state of the gas engine 6, or may be decided as described later, for example.

In step S43, the supply of the fuel gas G at the flow rate decided in step S42 to the main chamber 7m and the prechamber 7s of the misfiring cylinder 71t is started. In step S44, the in-cylinder pressure P of the misfiring cylinder 71t is monitored, and the presence or absence of reignition is determined on the basis of the change in the in-cylinder pressure P. If the reignition is confirmed (Yes in step S45), in step S46, the flow rate of the target main chamber gas Gt is restored to the amount under normal control according to the operational state of the gas engine 6, and the set value of the air-fuel ratio, the ignition timing, etc., are also restored gradually to the normal control (see time t4 and later in FIG. 5A described later). Conversely, if the reignition is not confirmed within a predetermined time in step S45, it is assumed that the reignition process S has failed, and the misfiring cylinder 71t is cut off in step S47.

The order of step S41 and step S42 may be reversed. Further, the timing of the supply of the fuel gas G to the main chamber 7m and the prechamber 7s of the misfiring cylinder 71t may be the same, or the supply of the fuel gas G to the prechamber 7s may be started earlier by a predetermined cycle, for example 1 or 2 cycles, than the supply to the main chamber 7m (see FIGS. 5A and 5B described later). Since the ignition in the main chamber 7m is performed by the combustion flame generated in the prechamber 7s, it is possible to reduce the amount of unburned gas flowing out to the exhaust passage.

Further, in the embodiment shown in FIGS. 1 to 3, the reignition execution unit 3 is connected to the execution permission unit 2, and when a permission notification In of the reignition process S is input from the execution permission unit 2, instructs the engine controller 84 to execute the reignition process S.

According to the above configuration, the reignition process S for reigniting the cylinder 71 that misfires (misfiring cylinder 71t) is not unconditionally executed after the misfire occurs, but is executed if it is determined that the cause of the misfire is transient through the permission determination whether to execute the reignition process S. Specifically, by executing the permission determination, the presence or absence of problems due to load fluctuation are determined respectively from the presence or absence of hardware problems in the main chamber 7m or the prechamber 7s of the misfiring cylinder 71t, the presence or absence of software problems in functions (software/logic) which perform combustion control and combustion diagnosis of the gas engine 6 such as the determination of misfire and abnormal combustion, the presence or absence of problems specific to the misfiring cylinder 71t other than the above-described problems in the operational history such as the presence or absence of the execution of past reignition process S related to the misfiring cylinder 71*t*, the load condition of the gas engine 6 at the time of misfire or execution of the reignition process S, and the operational state such as the number of cylinders 71 that misfire at the same time.

Thus, the misfiring cylinder 71*t* can be reignited more reliably without repeating the reignition process S of the misfiring cylinder 71*t*. Therefore, when a misfire occurs due to a non-transient, constant problem (failure) in the gas engine 6, it is possible to prevent engine damage caused by repeatedly executing the reignition process S of the misfiring cylinder 71*t* and deterioration of the operating state, such as a further decrease in engine output or an emergency shutdown due to an induced misfire or abnormal combustion of the other cylinders 71.

Further, in some embodiments, as shown in FIG. 3 (and also FIG. 6 described later), the reignition processing device 1 may further include a receiving unit 4 configured to receive an execution instruction Ce of the reignition process S of the misfiring cylinder 71*t* from an external source. In this case, the execution permission unit 2 performs the above-described permission determination on the basis of the presence or absence of reception of the execution instruction Ce. In other words, if the execution instruction Ce from the operator is not received, the execution of the reignition process S is not permitted even if other permission conditions as described above are satisfied. Thus, it is possible to prevent an unexpected situation from occurring in the gas engine 6.

In the embodiment shown in FIG. 3, the receiving unit 4 is communicably connected to a terminal 14 operated by the operator and is also connected to the execution permission unit 2. When the execution instruction Ce is input from the terminal 14, the receiving unit 4 notifies the execution permission unit 2 to that effect.

Figure 5A:
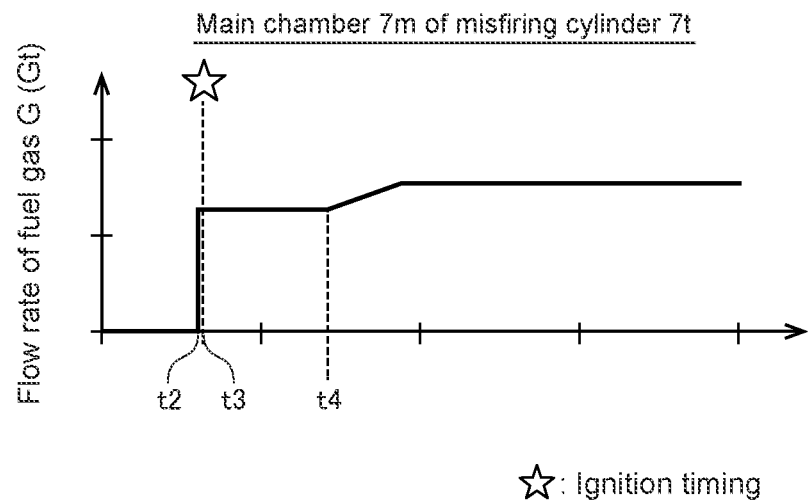
FIG. 5A is a diagram showing the time transition of the flow rate of fuel gas supplied to a main chamber by reignition process of a cylinder according to an embodiment of the present invention.
Figure 5B:
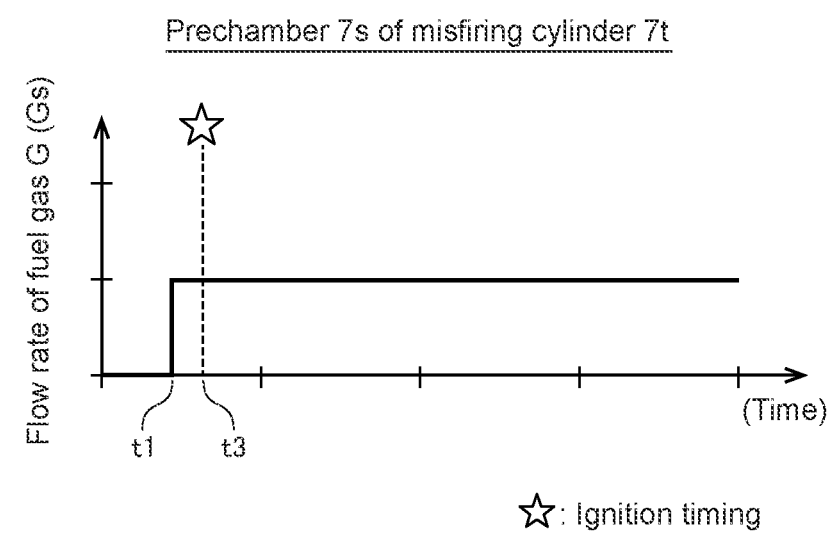
FIG. 5B is a diagram showing the time transition of the flow rate of fuel gas supplied to a prechamber by reignition process of a cylinder according to an embodiment of the present invention, where the time axis corresponds to FIG. 5A.

Next, some embodiments related to the reignition process S will be described with reference to FIGS. 5A and 5B. FIG. 5A is a diagram showing the time transition of the flow rate of the fuel gas G supplied to the main chamber 7*m* by the reignition process S according to an embodiment of the present invention. FIG. 5B is a diagram showing the time transition of the flow rate of the fuel gas G supplied to the prechamber 7*s* by the reignition process S according to an embodiment of the present invention, where the time axis corresponds to FIG. 5A.

In some embodiments, as shown in FIG. 3, the reignition execution unit 3 may decide the flow rate of the fuel gas G (hereinafter, target main chamber gas Gt) supplied to the main chamber 7*m* of the misfiring cylinder 71*t* at the start of the reignition process S on the basis of the flow rate of the fuel gas G (hereinafter, reference main chamber gas) supplied to each main chamber 7*m* of the remaining cylinders 71 that have not misfired. In the embodiment shown in FIG. 3, the reignition execution unit 3 has a fuel amount decision unit 31 configured to decide the flow rate of the target main chamber gas Gt on the basis of the flow rate of the reference main chamber gas of the remaining cylinders 71 that have not misfired.

For example, in some embodiments, the reignition execution unit 3 (fuel amount decision unit 31) may decide the flow rate of the target main chamber gas Gt to an amount smaller than the average value of the flow rate of the reference main chamber gas supplied to each main chamber 7*m* of the remaining cylinders 71 that have not misfired. Specifically, for example, the flow rate of the target main chamber gas Gt may be decided to a value obtained by multiplying the average value of the flow rate of the reference main chamber gas by a predetermined ratio (for example, 90%). Thus, when the gas engine 6 has a problem that cannot be detected even by the permission determination of the reignition process S, even if abnormal combustion occurs due to the execution of the reignition process S, the effect (damage) on the engine can be reduced.

According to the above configuration, the flow rate of the fuel gas G (target main chamber gas Gt) supplied to the main chamber of the misfiring cylinder 71*t* (the amount of the fuel gas G per unit time), which is restarted at the start of the reignition process S, is decided on the basis of the flow rate of the fuel gas G (reference main chamber gas) supplied to each remaining cylinder 71 during the cylinder cut-off operation that have not misfired. As a result, the flow rate of the target main chamber gas Gt can be set to an optimum value according to operational conditions (including the gas property fluctuation) of the gas engine 6.

Further, in some embodiments, as shown in FIG. 3, the reignition execution unit 3 may further has a valve opening degree command unit 32 configured to transmit to the regulating valve (main chamber gas supply electromagnetic valve 91 in FIGS. 1 and 2) a valve opening degree corresponding to the flow rate of the target main chamber gas Gt decided by the fuel amount decision unit 31. In the embodiment shown in FIG. 3, the valve opening degree command unit 32 is connected to the fuel amount decision unit 31. Further, it is configured to calculate a valve opening degree (set valve opening degree Vt) required to have the flow rate of the target main chamber gas Gt input from the fuel amount decision unit 31, and transmit the calculated set valve opening degree Vt to the main chamber gas supply electromagnetic valve 91 of the misfiring cylinder 71*t*.

More specifically, the valve opening degree command unit 32 transmits to the gas supply controller 81 the set valve opening degree Vt and a valve opening degree setting command Iv which specifies the main chamber gas supply electromagnetic valve 91 to which the set valve opening degree Vt is applied. Upon receiving the valve opening degree setting command Iv, the gas supply controller 81 transmits a signal to the main chamber gas supply electromagnetic valve 91 specified by the valve opening degree setting command Iv, and sets the opening degree of this valve to the set valve opening degree Vt in the shortest time. As a result, as shown in FIG. 5A, the valve opening degree of the main chamber gas supply electromagnetic valve 91 is set to the set valve opening degree Vt, so that the gas is immediately supplied to the main chamber 7*m* of the misfiring cylinder 71*t* at the flow rate corresponding to the set valve opening degree Vt.

The horizontal axis of the graph of FIG. 5A represents the time, and the vertical axis represents the flow rate of the fuel gas G (the same applies to FIG. 5B). By setting the valve opening degree to the set valve opening degree Vt stepwise at once, the flow rate of the target main chamber gas Gt is also changed to the decided flow rate at once. Similarly, by setting the prechamber gas supply electromagnetic valve 92 to a valve opening degree corresponding to the decided flow rate in the shortest time, as shown in FIG. 5B, the flow rate of the fuel gas G supplied to the prechamber 7*s* is also changed to the decided flow rate at once. As a result, the air-fuel ratio in the prechamber 7*s* reaches a value suitable for ignition in a short time, and the ignition is performed quickly at time t3. The time t2, at which the fuel gas G is started to be supplied to the main chamber 7*m* of the misfiring cylinder 71*t*, is one or two cycles later than the time t1, at which the fuel gas G is started to be supplied to the prechamber 7s (t1<t2<t3<t4).

According to the above configuration, at the start of the reignition process S, the valve opening degree of the regulating valve for regulating the flow rate of the target main chamber gas Gt to the main chamber of the misfiring cylinder 71t is set from the closed state to a valve opening degree (set valve opening degree Vt) at which the decided flow rate of the target main chamber gas Gt can be supplied to the main chamber. In other words, the valve opening degree of the regulating valve is not opened stepwise to the set valve opening degree Vt by control, but is opened immediately to the set valve opening degree Vt. The present inventors have found that when a certain amount of the fuel gas G is supplied to the main chamber 7m by immediately reflecting the decided flow rate of the target main chamber gas Gt in the regulating valve, rather than increasing the flow rate stepwise over time, the cylinder can be reignited quickly after supplying the target main chamber gas Gt. The quick reignition prevents the target main chamber gas Gt from flowing out to the exhaust passage as unburned gas without igniting, and prevents problems such as duct explosion caused by leakage of the unburned gas.

Further, in some embodiments, as shown in FIG. 3, the reignition execution unit 3 may decide the flow rate of the fuel gas G (hereinafter, target prechamber gas Gs) supplied to the prechamber 7s of the misfiring cylinder 71t at the start of the reignition process S on the basis of the flow rate of the fuel gas G (hereinafter, reference prechamber gas) supplied to each prechamber 7s of the remaining cylinders 71 that have not misfired. Specifically, the reignition execution unit 3 has a fuel amount decision unit 31 configured to decide the flow rate of the target prechamber gas Gs on the basis of the flow rate of the reference prechamber gas of the remaining cylinders 71 that have not misfired. In the embodiment shown in FIG. 3, the fuel amount decision unit 31 decides both the flow rate of the target main chamber gas Gt and the flow rate of the target prechamber gas Gs.

For example, in some embodiments, the reignition execution unit 3 (fuel amount decision unit 31) may decide the flow rate of the target prechamber gas Gs to an amount smaller than the average value of the flow rate of the reference prechamber gas supplied to each prechamber 7s of the remaining cylinders 71 that have not misfired. Specifically, for example, the flow rate of the target prechamber gas Gs may be decided to a value obtained by multiplying the average value of the flow rate of the reference prechamber gas by a predetermined ratio (for example, 90%). Thus, when the gas engine 6 has a problem that cannot be detected even by the permission determination of the reignition process S, even if abnormal combustion occurs due to the execution of the reignition process S, the effect (damage) on the engine can be reduced.

According to the above configuration, the flow rate of the fuel gas G (target prechamber gas Gs) supplied to the prechamber 7s of the misfiring cylinder 71t (the amount of the fuel gas G per unit time), which is restarted at the start of the reignition process S, is decided on the basis of the flow rate of the fuel gas G (reference prechamber gas) supplied to each prechamber 7s of the remaining cylinders 71 during the cylinder cut-off operation that have not misfired. Thus, the flow rate of the target prechamber gas Gs can be set to an optimum value according to operational conditions (including the gas property fluctuation) of the gas engine 6.

Further, in some embodiments, as shown in FIG. 3, the reignition execution unit 3 may further has a valve opening degree command unit 32 configured to transmit to the regulating valve (prechamber gas supply electromagnetic valve 92 in FIGS. 1 and 2) a valve opening degree corresponding to the flow rate of the target prechamber gas Gs decided by the fuel amount decision unit 31. Specifically, the valve opening degree command unit 32 is connected to the fuel amount decision unit 31. Further, it is configured to calculate a valve opening degree (set valve opening degree Vs) required to have the flow rate of the target prechamber gas Gs input from the fuel amount decision unit 31, and transmit the calculated set valve opening degree Vs to the prechamber gas supply electromagnetic valve 92 of the misfiring cylinder 71t. In the embodiment shown in FIG. 3, the valve opening degree command unit 32 transmits the set valve opening degree (Vt, Vs) to each main chamber gas supply electromagnetic valve 91 and the prechamber gas supply electromagnetic valve 92.

More specifically, the valve opening degree command unit 32 transmits to the gas supply controller 81 the set valve opening degree Vs and a valve opening degree setting command Iv (Vs) which specifies the prechamber gas supply electromagnetic valve 92 to which the set valve opening degree Vs is applied. Upon receiving the valve opening degree setting command Iv, the gas supply controller 81 transmits a signal to the prechamber gas supply electromagnetic valve 92 specified by the valve opening degree setting command Iv, and sets the opening degree of this valve to the set valve opening degree Vs in the shortest time. As a result, as shown in FIG. 5B, the valve opening degree of the prechamber gas supply electromagnetic valve 92 is set to the set valve opening degree Vs, so that the gas is immediately supplied to the prechamber 7s of the misfiring cylinder 71t at the flow rate corresponding to the set valve opening degree Vs.

The horizontal axis of the graph of FIG. 5B represents the time, and the vertical axis represents the flow rate of the fuel gas G. By setting the valve opening degree to the set valve opening degree Vs stepwise at once, as shown in FIG. 5B, the flow rate of the fuel gas G supplied to the prechamber 7s is also changed to the decided flow rate at once. As a result, the air-fuel ratio in the prechamber 7s reaches a value suitable for ignition in a short time, and the ignition is performed quickly at time t3.

According to the above configuration, at the start of the reignition process S, the valve opening degree of the regulating valve for regulating the flow rate of the target prechamber gas Gs to the prechamber 7s of the misfiring cylinder 71t is set from the closed state to a valve opening degree (set valve opening degree Vs) at which the decided flow rate of the target prechamber gas Gs can be supplied to the prechamber 7s. In other words, the valve opening degree of the regulating valve 92 is not opened stepwise to the set valve opening degree Vs by control, but is opened immediately to the set valve opening degree Vs. The present inventors have found that when a certain amount of the fuel gas G is supplied to the prechamber 7s by immediately reflecting the decided flow rate of the target prechamber gas Gs in the regulating valve, rather than increasing the flow rate stepwise over time, the cylinder can be reignited quickly after supplying the target prechamber gas Gs. The quick reignition prevents the target prechamber gas Gs from flowing out to the exhaust passage as unburned gas without igniting, and prevents problems such as exhaust duct explosion caused by leakage of the unburned gas.

Figure 6:
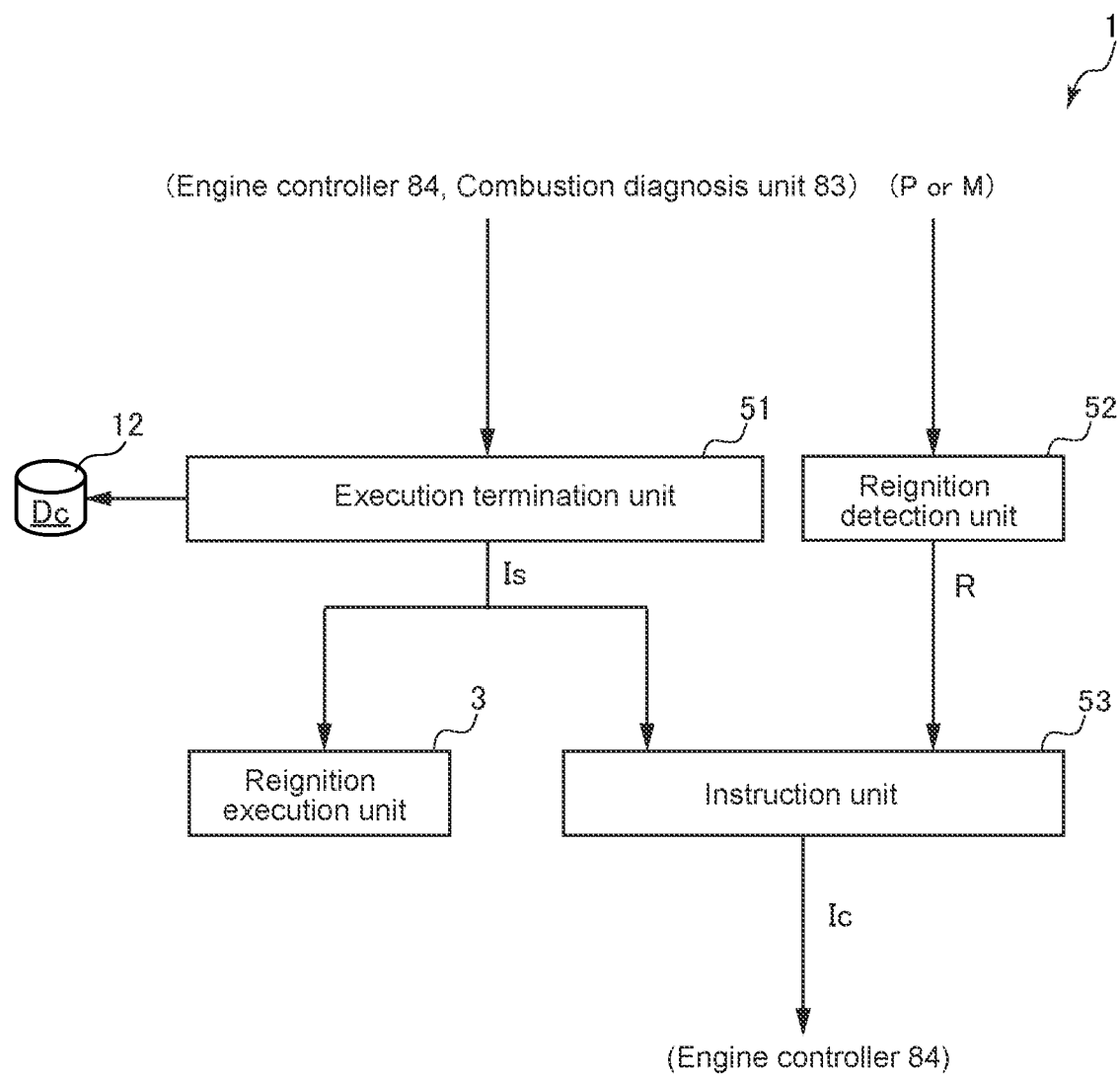
FIG. 6 is a block diagram schematically showing another function of a reignition processing device according to an embodiment of the present invention.

Next, another embodiment related to the reignition processing device 1 will be described with reference to FIG. 6. FIG. 6 is a block diagram schematically showing another function of the reignition processing device 1 according to an embodiment of the present invention. FIG. 6 shows only functional units of the reignition processing device 1 related to the description and does not show the other units.

In some embodiments, the reignition processing device 1 may further include an execution termination unit 51 configured to, if a predetermined termination condition is satisfied during execution of the reignition process S by the reignition execution unit 3, terminate the reignition process S under execution. When the reignition process S is terminated in the middle by the execution termination unit 51, this execution history is recorded in the operational history Dc of the cylinder 71 subjected to the terminated reignition process S. Further, the execution permission unit 2 may be configured to permit the reignition process S if the operational history Dc does not include the execution history indicating that the reignition process S has been terminated.

The termination condition may include at least one of that abnormal combustion occurs in the misfiring cylinder 71t which executes the reignition process S or that an abnormality is detected in the control device 8. The method for detecting the presence or absence of abnormal combustion and the presence or absence of abnormality in the control device 8 is the same as described above and thus will not be described here.

More specifically, the execution termination unit 51 may be configured to terminate the reignition process S under execution determined according to the termination condition. When a plurality of cylinders 71 misfire at the same time, the permission determination whether to execute the reignition process S is made for each misfiring cylinders 71t. In this case, abnormal combustion may occur due to a cause specific to the individual cylinder 71. If the abnormal combustion is due to the individual cylinder 71, only the reignition process S of the misfiring cylinder 71t in which the abnormal combustion has occurred may be terminated. Further, when the abnormality in the control device 8 affects an individual reignition process S, only the affected reignition process S may be terminated, while when the abnormality affects all reignition processes S, all the reignition processes S may be terminated. In the latter case, when the reignition processes S are sequentially executed, the reignition process S scheduled to be executed after the terminated reignition process S may canceled. When the reignition processes S are executed in parallel, once one reignition process S is determined to be terminated, the other reignition processes S may be terminated without confirming the termination conditions.

In the embodiment shown in FIG. 6, the execution termination unit 51 is configured to receive the combustion diagnosis result M obtained by the combustion diagnosis unit 83 and alarm information generated during the execution of the reignition process S. Further, the execution termination unit 51 is configured to monitor the above-described two conditions as the termination condition. The execution termination unit 51 is connected to the reignition execution unit 3. If the termination condition is satisfied, a termination command Is is transmitted to the reignition execution unit 3, and this fact is recorded in the operational history Dc of the cylinder 71 subjected to the terminated reignition process S. As a result, when the execution permission unit 2 makes the permission determination for a subsequent misfiring cylinder 71t, it is possible to determine whether the reignition process S has been tried in the past by checking the operational history Dc.

On the other hand, the reignition execution unit 3 terminates the reignition process S upon receiving the termination command Is from the execution termination unit 51. For example, the reignition execution unit 3 may perform the cylinder cut-off for the misfiring cylinder 71t at the same time as the reignition process S is terminated, and it may be performed only when the misfiring cylinder 71t subjected to the terminated reignition process S is not reignited.

According to the above configuration, the execution permission unit 2 does not permit the execution of the reignition process S of the cylinder 71 that has misfired in the past and has terminated the reignition process S during execution of the reignition process S even if a misfire is detected. Thus, when the gas engine 6 has a problem that cannot be detected even by the permission determination of the reignition process S, it is possible to suppress the spread of damage due to repeated execution (retry) of the reignition process S.

Further, in some embodiments, as shown in FIG. 6, the reignition processing device 1 may further include a reignition detection unit 52 configured to detect reignition of the misfiring cylinder 71t that executes the reignition process S by the reignition execution unit 3, and an instruction unit 53 configured to, if the reignition process S is terminated after the reignition in the misfiring cylinder 71t, instruct the control device 8 to maintain a condition of the combustion control when the reignition process S of the misfiring cylinder 71t is terminated.

For example, after Yes in step S45 in FIG. 4, if it is detected that the termination condition is satisfied before the completion of step S46, the instruction unit 53 issues the above-described instruction (maintenance command Ic). Upon receiving the instruction from the instruction unit 53, the control device 8 continues the operation at the flow rate of the fuel gas G supplied to the misfiring cylinder 71t that executes the reignition process S at that time, the ignition timing, the air-fuel ratio, and the load upper limit. The presence or absence of reignition may be determined on the basis of the change in the in-cylinder pressure P of the misfiring cylinder 71t.

In the embodiment shown in FIG. 6, the instruction unit 53 is connected to each execution termination unit 51 and the reignition detection unit 52. Further, the instruction unit 53 receives the termination command Is of the reignition process S from the execution termination unit 51 and receives the detection result (reignition detection result R) of the presence or absence of reignition from the reignition detection unit 52. Further, the instruction unit 53 transmits the maintenance command Ic to the engine controller 84 if the reignition has been completed at the time of reception of the termination command Is, on the basis of the presence or absence of the input of the termination command Is of the reignition process S and the reignition detection result R.

The reignition detection unit 52 may detect the presence or absence of reignition by input of the in-cylinder pressure P, or may detect the presence or absence of reignition by input of the diagnosis result of the presence of absence of misfire by the combustion diagnosis unit 83.

According to the above configuration, if the termination condition is satisfied after the completion of reignition in the misfiring cylinder 71t, the operational state when the termination condition is satisfied is maintained. Specifically, the supply of the target main chamber gas is not actively stopped (the cylinder cut-off is not performed), and the air-fuel ratio is not completely restored. Thus, the operation of the gas engine 6 including the reignited misfiring cylinder 71t can be continued, and the risk due to output reduction such as demand-over during power generation can be reduced.

Hereinafter, the reignition method corresponding to the process performed by the reignition processing device 1 will be described with reference to FIG. 7. FIG. 7 is a diagram showing the reignition method for a gas engine according to an embodiment of the present invention.

The reignition method for the gas engine 6 is a method for executing the reignition process S for reigniting a misfiring cylinder 71 during the operation of the gas engine 6 having multiple cylinders 71. As shown in FIG. 7, the reignition method includes an execution permission step (S1) and a reignition execution step (S2). Each step will now be described.

The execution permission step (S1) is a step of, when at least one of the cylinders 71 misfires, performing permission determination whether to execute the reignition process S of the misfiring cylinder 71t, on the basis of the damage diagnosis result Da of the misfiring cylinder 71t, the presence or absence of abnormality in the control device 8, the operational history Dc related to the misfiring cylinder 71t, and the operational state Dd of the gas engine 6. The execution permission step is the same as the processing contents performed by the execution permission unit 2 as already described and thus not described again in detail.

The reignition execution step (S2) is a step of executing the reignition process S of the misfiring cylinder 71t that is permitted by the permission determination in the execution permission step to execute the reignition process S. The reignition execution step is the same as the processing contents performed by the reignition execution unit 3 as already described and thus not described again in detail.

That is, the execution permission step is performed in step S1, and if the execution permission is granted (Yes in step S2), the reignition execution step is performed. In the embodiment shown in FIG. 7, in the execution permission step, the permission determination is performed also on the basis of the presence or absence of reception of the execution instruction Ce from the operator. In an embodiment, the operator may be asked whether to issue the execution instruction Ce when all the other permission conditions are satisfied, and the step S2 may be performed when the execution instruction Ce is received. The reignition execution step is performed according to FIG. 4 as described above.

In some embodiments, the reignition execution step may include a fuel amount decision step (not shown) of deciding the flow rate of at least one of the target main chamber gas Gt or the target prechamber gas Gs of the misfiring cylinder 71t at the start of the reignition process S on the basis of the flow rate of the reference main chamber gas supplied to each main chamber 7m of the remaining cylinders 71 that have not misfired. Further, in some embodiments, the reignition execution step may include a valve opening degree command step (not shown) of transmitting a valve opening degree corresponding to the decided flow rates of the target main chamber gas Gt and the target prechamber gas Gs to the regulating valves (main chamber gas supply electromagnetic valve 91 and prechamber gas supply electromagnetic valve 92 in FIGS. 1 and 2) to set the opening degrees of the regulating valves. In some embodiments, these embodiments may be combined. The fuel amount decision step and the valve opening degree command step are the same as the processing contents performed by the fuel amount decision unit 31 and the valve opening degree command unit 32 as already described and thus not described again in detail.

Further, in some embodiments, the reignition method may further include an execution termination step (not shown) of, if a predetermined termination condition is satisfied during execution of the reignition process S by the reignition execution step, terminating the reignition process S under execution. Further, in some embodiments, the reignition method may further include a reignition detection step (not shown) of detecting reignition of the misfiring cylinder 71t that executes the reignition process S by the reignition execution step, and an instruction step of, if the reignition process S is terminated after the reignition in the misfiring cylinder 71t, instructing the control device 8 to maintain a condition of the combustion control when the reignition process S of the misfiring cylinder 71t is terminated. The execution termination step, the reignition detection step, and the instruction step are the same as the processing contents performed by the execution termination unit 51, the reignition detection unit 52, and the instruction unit 53 as already described and thus not described again in detail.

The present invention is not limited to the embodiments described above, but includes modifications to the embodiments described above, and embodiments composed of combinations of those embodiments.

APPENDIX (1) A reignition processing device (1) for a gas engine (6) according to at least one embodiment of the present invention is a reignition processing device (1) for a gas engine (6) for executing a reignition process (S) of a cylinder (71t) during operation of a gas engine (6) having multiple cylinders (71), comprising: an execution permission unit (2) configured to, when at least one of the cylinders (71) misfires, perform permission determination whether to execute the reignition process (S) of a misfiring cylinder (71t) which is the at least one cylinder that misfires, on the basis of a damage diagnosis result (Da) based on an in-cylinder pressure (P) of the misfiring cylinder (71t), presence or absence of abnormality in a control device (8) which performs combustion control and combustion diagnosis of the gas engine (6), an operational history related to the misfiring cylinder (71t), and an operational state of the gas engine (6); and a reignition execution unit (3) configured to execute the reignition process (S) of the misfiring cylinder (71t) that is permitted by the permission determination to execute the reignition process (S).

According to the above configuration (1), the reignition process (S) for reigniting the misfiring cylinder (71t) is not unconditionally executed after the misfire occurs, but is executed if it is determined that the cause of the misfire is transient through the permission determination whether to execute the reignition process (S). Specifically, by executing the permission determination, the presence or absence of problems due to load fluctuation are determined respectively from the presence or absence of hardware problems in the main chamber (7m) or the prechamber (7s) of the misfiring cylinder (71t), the presence or absence of software problems in functions (software/logic) which perform combustion control and combustion diagnosis of the gas engine (6) such as the determination of misfire and abnormal combustion, the presence or absence of problems specific to the misfiring cylinder (71t) other than the above-described problems in the operational history such as the presence or absence of the execution of past reignition process (S) related to the misfiring cylinder (71t), the load condition of the gas engine (6) at the time of misfire or execution of the reignition process (S), and the operational state such as the number of cylinders (71) that misfire at the same time.

Thus, the misfiring cylinder (71t) can be reignited more reliably without repeating the reignition process (S) of the misfiring cylinder (71t). Therefore, when a misfire occurs due to a non-transient, constant problem (failure) in the gas engine (6), it is possible to prevent engine damage caused by repeatedly executing the reignition process (S) of the misfiring cylinder (71t) and deterioration of the operating state, such as a further decrease in engine output or an emergency shutdown due to an induced misfire or abnormal combustion of other cylinders (71).

(2) In some embodiments, in the above configuration (1), the reignition processing device further comprises a receiving unit (4) configured to receive an execution instruction (Ce) of the reignition process (S) of the misfiring cylinder (71t) from an external source. The execution permission unit (2) is configured to perform the permission determination on the basis of presence or absence of reception of the execution instruction (Ce).

According to the above configuration (2), the permission determination is performed on the basis of the presence or absence of the execution instruction (Ce) from the operator. In other words, if the execution instruction (Ce) from the operator is not received, the execution of the reignition process (S) is not permitted even if other permission conditions are satisfied. Thus, it is possible to prevent an unexpected situation from occurring in the gas engine (6).

(3) In some embodiments, in the above configuration (1) or (2), the gas engine (6) has multiple main chambers (7m) defined by a cylinder head (73) and a piston (72) slidably disposed within each cylinder (71), and a prechamber (7s) connected to each main chamber (7m) through a nozzle hole. The gas engine is configured to stop supply of a fuel gas (G) to the main chamber (7m) of the misfiring cylinder (71t) and the prechamber (7s) that is connected to the main chamber (7m) of the misfiring cylinder (71t). The reignition execution unit (3) has a fuel amount decision unit (31) configured to decide a flow rate of a target main chamber gas (Gt) which is the fuel gas (G) supplied to the main chamber (7m) of the misfiring cylinder (71t) at start of the reignition process (S), on the basis of a flow rate of a reference main chamber gas which is the fuel gas (G) supplied to each main chamber (7m) of remaining cylinders (71) that have not misfired.

According to the above configuration (3), the flow rate of the fuel gas (Gt) supplied to the main chamber (7m) of the misfiring cylinder (71t) (the amount of the fuel gas (G) per unit time), which is restarted at the start of the reignition process (S), is decided on the basis of the flow rate of the fuel gas (G) (reference main chamber gas) supplied to each remaining cylinder (71) during the cylinder cut-off operation that have not misfired. Thus, the flow rate of the target main chamber gas (Gt) can be set to an optimum value according to operational conditions (including the gas property fluctuation) of the gas engine (6).

(4) In some embodiments, in the above configuration (3), the fuel amount decision unit (31) is configured to decide the flow rate of the target main chamber gas (Gt) to an amount smaller than an average value of the flow rate of the reference main chamber gas.

According to the above configuration (4), the flow rate of the target main chamber gas (Gt) at the start of the reignition process (S) is set to a smaller value than usual. Thus, when the gas engine (6) has a problem that cannot be detected even by the permission determination of the reignition process (S), even if abnormal combustion occurs due to the execution of the reignition process (S), the effect (damage) on the engine can be reduced.

(5) In some embodiments, in the above configuration (3) or (4), the gas engine (6) is configured to regulate the flow rate of the fuel gas (G) supplied to each main chamber (7m) by a regulating valve (91, 92). The reignition execution unit (3) further has a valve opening degree command unit (32) configured to transmit to the regulating valve (91) a valve opening degree corresponding to the decided flow rate of the target main chamber gas (Gt).

According to the above configuration (5), at the start of the reignition process (S), the valve opening degree of the regulating valve for regulating the flow rate of the target main chamber gas (Gt) to the main chamber (7m) of the misfiring cylinder (71t) is set from the closed state to a valve opening degree (Vt) at which the decided flow rate of the target main chamber gas (Gt) can be supplied to the main chamber (7m). In other words, the valve opening degree of the regulating valve is not opened stepwise to the set valve opening degree (Vt) by control, but is opened immediately to the set valve opening degree (Vt). The present inventors have found that when a certain amount of the fuel gas (G) is supplied to the main chamber (7m) by immediately reflecting the decided flow rate of the target main chamber gas (Gt) in the regulating valve, rather than increasing the flow rate stepwise over time, the cylinder can be reignited quickly after supplying the target main chamber gas (Gt). The quick reignition prevents the target main chamber gas (Gt) from flowing out to the exhaust passage as unburned gas without igniting, and prevents problems such as duct explosion caused by leakage of the unburned gas.

(6) In some embodiments, in any one of the above configurations (1) to (5), the gas engine (6) has multiple main chambers (7m) defined by a cylinder head (73) and a piston (72) slidably disposed within each cylinder (71), and a prechamber (7s) connected to each main chamber (7m) via a nozzle hole. The gas engine is configured to stop supply of a fuel gas (G) to the main chamber (7m) of the misfiring cylinder (71t) and the prechamber (7s) that is connected to the main chamber (7m) of the misfiring cylinder (71t). The reignition execution unit (3) has a fuel amount decision unit (31) configured to decide a flow rate of a target prechamber gas (Gs) which is the fuel gas (G) supplied to the prechamber (7s) of the misfiring cylinder at start of the reignition process (S), on the basis of a flow rate of a reference prechamber gas which is the fuel gas (G supplied to each prechamber (7s) of remaining cylinders (71) that have not misfired.

According to the above configuration (6), the flow rate of the fuel gas (Gs) supplied to the prechamber (7s) of the misfiring cylinder (71t) (the amount of the fuel gas (G) per unit time), which is restarted at the start of the reignition process (S), is decided on the basis of the flow rate of the fuel gas (G) (reference prechamber gas) supplied to each remaining cylinder (71) during the cylinder cut-off operation that have not misfired. Thus, the flow rate of the target prechamber gas (Gs) can be set to an optimum value according to operational conditions (including the gas property fluctuation) of the gas engine (6).

(7) In some embodiments, in the above configuration (6), the fuel amount decision unit (31) is configured to decide the flow rate of the target prechamber gas (Gs) to an amount smaller than an average value of the flow rate of the reference prechamber gas.

According to the above configuration, the flow rate of the fuel gas (target prechamber gas Gs) supplied to the prechamber (7s) of the misfiring cylinder (71t) (the amount of the fuel gas G per unit time), which is restarted at the start of the reignition process (S), is decided on the basis of the flow rate of the fuel gas (reference prechamber gas) supplied to each prechamber (7s) of the remaining cylinders (71) during the cylinder cut-off operation that have not misfired. Thus, the flow rate of the target prechamber gas (Gs) can be set to an optimum value according to operational conditions (including the gas property fluctuation) of the gas engine 6.

(8) In some embodiments, in the above configuration (6) or (7), the gas engine (6) is configured to regulate the flow rate of the fuel gas (G) supplied to each prechamber (7s) by a regulating valve (91, 92). The reignition execution unit (3) further has a valve opening degree command unit (32) configured to transmit to the regulating valve (92) a valve opening degree corresponding to the decided flow rate of the target prechamber gas (Gs).

According to the above configuration, at the start of the reignition process (S), the valve opening degree of the regulating valve (92) for regulating the flow rate of the target prechamber gas (Gs) to the prechamber (7s) of the misfiring cylinder (71t) is set from the closed state to a valve opening degree (set valve opening degree Vs) at which the decided flow rate of the target prechamber gas (Gs) can be supplied to the prechamber (7s). In other words, the valve opening degree of the regulating valve (92) is not opened stepwise to the set valve opening degree (Vs) by control, but is opened immediately to the set valve opening degree (Vs). The present inventors have found that when a certain amount of the fuel gas (G) is supplied to the prechamber (7s) by immediately reflecting the decided flow rate of the target prechamber gas (Gs) in the regulating valve, rather than increasing the flow rate stepwise over time, the cylinder can be reignited quickly after supplying the target prechamber gas (Gs). The quick reignition prevents the target prechamber gas (Gs) from flowing out to the exhaust passage as unburned gas without igniting, and prevents problems such as exhaust duct explosion caused by leakage of the unburned gas.

(9) In some embodiments, in any one of the above configurations (1) to (8), the reignition processing device further comprises an execution termination unit (51) configured to, if a predetermined termination condition is satisfied during execution of the reignition process (S), terminate the reignition process (S) under execution determined according to the termination condition. The execution permission unit (2) is configured to permit the reignition process (S) if the operational history does not include an execution history indicating that the reignition process (S) has been terminated.

According to the above configuration (9), the execution permission unit (2) does not permit the execution of the reignition process (S) of the cylinder (71) that has misfired in the past and has terminated the reignition process (S) during execution of the reignition process (S) even if a misfire is detected. Thus, when the gas engine (6) has a problem that cannot be detected even by the permission determination of the reignition process (S), it is possible to suppress the spread of damage due to repeated execution (retry) of the reignition process (S).

(10) In some embodiments, in the above configuration (9), the reignition processing device further comprises: a reignition detection unit (52) configured to detect reignition of the misfiring cylinder (71t) that executes the reignition process (S); and an instruction unit (53) configured to, if the reignition process (S) is terminated after the reignition in the misfiring cylinder (71t), instruct the control device (8) to maintain a condition of the combustion control when the reignition process (S) of the misfiring cylinder (71t) is terminated.

According to the above configuration (10), if the reignition process (S) is terminated after the reignition in the misfiring cylinder (71t), the combustion control state when the termination condition is satisfied is maintained. Specifically, the supply of the target main chamber gas (Gt) is not actively stopped (cylinder cut-off is not performed), and the air-fuel ratio is not completely restored. Thus, the operation of the gas engine (6) including the reignited cylinder (71) can be continued, and the risk due to output reduction such as demand-over during power generation can be reduced.

(11) A reignition method for a gas engine (6) according to at least one embodiment of the present invention is a reignition method for a gas engine (6) for executing a reignition process (S) of a cylinder during operation of a gas engine (6) having multiple cylinders (71), comprising: a step of, when at least one of the cylinders (71) misfires, performing permission determination whether to execute the reignition process (S) of a misfiring cylinder (71t) which is the at least one cylinder that misfires, on the basis of a damage diagnosis result (Da) based on an in-cylinder pressure (P) of the misfiring cylinder (71t), presence or absence of abnormality in a control device (8) which performs combustion control and combustion diagnosis of the gas engine (6), an operational history related to the misfiring cylinder (71t), and an operational state of the gas engine (6); and a step of executing the reignition process (S) of the misfiring cylinder (71t) if execution of the reignition process (S) is permitted by the permission determination.

With the above configuration (11), the same effect is achieved as in the above (1).

(12) A reignition program for a gas engine (6) according to at least one embodiment of the present invention is a reignition program for a gas engine (6) for executing a reignition process (S) of a cylinder during operation of a gas engine (6) having multiple cylinders (71), being configured to cause a computer to implement: an execution permission unit (2) configured to, when at least one of the cylinders (71) misfires, perform permission determination whether to execute the reignition process (S) of a misfiring cylinder (71t) which is the at least one cylinder that misfires, on the basis of a damage diagnosis result (Da) based on an in-cylinder pressure (P) of the misfiring cylinder (71t), presence or absence of abnormality in a control device (8) which performs combustion control and combustion diagnosis of the gas engine (6), an operational history related to the misfiring cylinder (71t), and an operational state of the gas engine (6); and a reignition execution unit (3) configured to execute the reignition process (S) of the misfiring cylinder (71t) if execution of the reignition process (S) is permitted by the permission determination.

With the above configuration (12), it is possible to achieve the same effect as the above configuration (1).

REFERENCE SIGNS LIST

1 Reignition processing device
12 Storage unit
14 Terminal
2 Execution permission unit
3 Reignition execution unit
31 Fuel amount decision unit
32 Valve opening degree command unit
4 Receiving unit
51 Execution termination unit
52 Reignition detection unit
53 Instruction unit
6 Gas engine
6s Crank shaft
6t Generator
7 Engine
7h Nozzle hole
7m Main chamber
7s Prechamber 71 Cylinder
71t Misfiring cylinder
72 Piston
73 Cylinder head
74e Exhaust valve
74i Intake valve
75e Exhaust pipe
75i Intake pipe
76 Ignition device
76c Ignition coil
76p Spark plug
77 Supercharger
77b Bypass pipe
77c Compressor
77t Turbine
77v Exhaust gas bypass valve
78 Exhaust gas outlet pipe
79 Air cooler
79v Intake air temperature regulating valve
8 Control device
81 Gas supply controller
82 Ignition controller
83 Combustion diagnosis unit
84 Engine controller
85 Damage diagnosis unit
91 Main chamber gas supply electromagnetic valve
92 Prechamber gas supply electromagnetic valve
94 Shutoff valve
95L Load detector
95N Revolution speed detector
95P In-cylinder pressure detector
96 Fuel supply main pipe
96m Main chamber gas supply pipe
96s Prechamber gas supply pipe
A Air
Ce Execution instruction
M Combustion diagnosis result
E Exhaust gas
G Fuel gas
Gt Target main chamber gas
Gs Target prechamber gas
H History information
Da Damage diagnosis result
Dc Operational history of misfiring cylinder
Dd Operational state of gas engine
In Permission notification
Is Termination command
Ic Maintenance command
Iv Valve opening degree setting command
L Load value
M Combustion diagnosis result
N Rotation speed
P In-cylinder pressure
S Reignition process
Vt Set valve opening degree (Valve opening of main chamber gas supply electromagnetic valve)
Vs Set valve opening degree (Valve opening of prechamber gas supply electromagnetic valve)

The invention claimed is:

1. A reignition processing device for a gas engine for executing a reignition process of a cylinder during operation of a gas engine having multiple cylinders, the reignition processing device comprising:
an execution permission unit configured to, when at least one of the cylinders misfires, perform permission determination whether to execute the reignition process of a misfiring cylinder which is the at least one cylinder that misfires, on the basis of a damage diagnosis result based on an in-cylinder pressure of the misfiring cylinder, presence or absence of abnormality in a control device which performs combustion control and combustion diagnosis of the gas engine, an operational history related to the misfiring cylinder, and an operational state of the gas engine; and
a reignition execution unit configured to execute the reignition process of the misfiring cylinder that is permitted by the permission determination to execute the reignition process.

2. The reignition processing device for a gas engine according to claim 1, further comprising a receiving unit configured to receive an execution instruction of the reignition process of the misfiring cylinder from an external source,
wherein the execution permission unit is configured to perform the permission determination on the basis of presence or absence of reception of the execution instruction.

3. The reignition processing device for a gas engine according to claim 1,
wherein the gas engine has multiple main chambers defined by a cylinder head and a piston slidably disposed within each cylinder, and a prechamber connected to each main chamber through a nozzle hole,
wherein the gas engine is configured to stop supply of a fuel gas to the main chamber of the misfiring cylinder and the prechamber that is connected to the main chamber of the misfiring cylinder, and
wherein the reignition execution unit has a fuel amount decision unit configured to decide a flow rate of a target main chamber gas which is the fuel gas supplied to the main chamber of the misfiring cylinder at start of the reignition process, on the basis of a flow rate of a reference main chamber gas which is the fuel gas supplied to each main chamber of remaining cylinders that have not misfired.

4. The reignition processing device for a gas engine according to claim 3,
wherein the fuel amount decision unit is configured to decide the flow rate of the target main chamber gas to an amount smaller than an average value of the flow rate of the reference main chamber gas.

5. The reignition processing device for a gas engine according to claim 3,
wherein the gas engine is configured to regulate the flow rate of the fuel gas supplied to each main chamber by a regulating valve, and
wherein the reignition execution unit further has a valve opening degree command unit configured to transmit to the regulating valve a valve opening degree corresponding to the decided flow rate of the target main chamber gas.

6. The reignition processing device for a gas engine according to claim 1,
wherein the gas engine has multiple main chambers defined by a cylinder head and a piston slidably disposed within each cylinder, and a prechamber connected to each main chamber through a nozzle hole,
wherein the gas engine is configured to stop supply of a fuel gas to the main chamber of the misfiring cylinder and the prechamber that is connected to the main chamber of the misfiring cylinder, and
wherein the reignition execution unit has a fuel amount decision unit configured to decide a flow rate of a target prechamber gas which is the fuel gas supplied to the prechamber of the misfiring cylinder at start of the reignition process, on the basis of a flow rate of a reference prechamber gas which is the fuel gas supplied to each prechamber of remaining cylinders that have not misfired.

7. The reignition processing device for a gas engine according to claim 6,
wherein the fuel amount decision unit is configured to decide the flow rate of the target prechamber gas to an amount smaller than an average value of the flow rate of the reference prechamber gas.

8. The reignition processing device for a gas engine according to claim 6,
wherein the gas engine is configured to regulate the flow rate of the fuel gas supplied to each prechamber by a regulating valve, and
wherein the reignition execution unit further has a valve opening degree command unit configured to transmit to the regulating valve a valve opening degree corresponding to the decided flow rate of the target prechamber gas.

9. The reignition processing device for a gas engine according to claim 1, further comprising an execution termination unit configured to, if a predetermined termination condition is satisfied during execution of the reignition process, terminate the reignition process under execution determined according to the termination condition,
wherein the execution permission unit is configured to permit the reignition process if the operational history does not include an execution history indicating that the reignition process has been terminated.

10. The reignition processing device for a gas engine according to claim 9, further comprising:
a reignition detection unit configured to detect reignition of the misfiring cylinder that executes the reignition process; and
an instruction unit configured to, if the reignition process is terminated after the reignition in the misfiring cylinder, instruct the control device to maintain a condition of the combustion control when the reignition process of the misfiring cylinder is terminated.

11. A reignition method for a gas engine for executing a reignition process of a cylinder during operation of a gas engine having multiple cylinders, the reignition method comprising:
a step of, when at least one of the cylinders misfires, performing permission determination whether to execute the reignition process of a misfiring cylinder which is the at least one cylinder that misfires, on the basis of a damage diagnosis result based on an in-cylinder pressure of the misfiring cylinder, presence or absence of abnormality in a control device which performs combustion control and combustion diagnosis of the gas engine, an operational history related to the misfiring cylinder, and an operational state of the gas engine; and
a step of executing the reignition process of the misfiring cylinder if execution of the reignition process is permitted by the permission determination.

12. A reignition program for a gas engine for executing a reignition process of a cylinder during operation of a gas engine having multiple cylinders, the reignition program being configured to cause a computer to implement:
an execution permission unit configured to, when at least one of the cylinders misfires, perform permission determination whether to execute the reignition process of a misfiring cylinder which is the at least one cylinder that misfires, on the basis of a damage diagnosis result based on an in-cylinder pressure of the misfiring cylinder, presence or absence of abnormality in a control device which performs combustion control and combustion diagnosis of the gas engine, an operational history related to the misfiring cylinder, and an operational state of the gas engine; and
a reignition execution unit configured to execute the reignition process of the misfiring cylinder if execution of the reignition process is permitted by the permission determination.

\* \* \* \* \*